(12) United States Patent
Shen

(10) Patent No.: US 7,913,360 B2
(45) Date of Patent: Mar. 29, 2011

(54) HINGE

(75) Inventor: Wen-Bin Shen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/412,384

(22) Filed: Mar. 27, 2009

(65) Prior Publication Data

US 2010/0139045 A1 Jun. 10, 2010

(30) Foreign Application Priority Data

Dec. 10, 2008 (CN) ........................ 2008 2 0303299 U

(51) Int. Cl.
*E05C 17/64* (2006.01)

(52) U.S. Cl. ........................ 16/340; 16/339; 16/337

(58) Field of Classification Search ............ 16/366, 16/284, 303, 325, 330, 337–340, 341–342; 248/922, 923
See application file for complete search history.

(56) References Cited

U.S. PATENT DOCUMENTS

| | | | |
|---|---|---|---|
| 7,219,393 B2 * | 5/2007 | Kida | 16/221 |
| 7,520,026 B1 * | 4/2009 | Lin | 16/337 |
| 7,533,446 B1 * | 5/2009 | Lin | 16/330 |
| 7,603,747 B2 * | 10/2009 | Ho et al. | 16/330 |
| 7,631,398 B1 * | 12/2009 | Lin | 16/341 |
| 2007/0180656 A1 * | 8/2007 | Chen et al. | 16/340 |
| 2007/0199179 A1 * | 8/2007 | Wang | 16/340 |
| 2008/0068494 A1 * | 3/2008 | Kim | 348/374 |
| 2009/0300881 A1 * | 12/2009 | Lin | 16/303 |
| 2009/0320243 A1 * | 12/2009 | Wang et al. | 16/303 |

* cited by examiner

*Primary Examiner* — David J Bagnell
*Assistant Examiner* — Matthew Sullivan
(74) *Attorney, Agent, or Firm* — Zhigang Ma

(57) ABSTRACT

A hinge includes a bracket with a protruding portion, a shaft extending through the bracket, a positioning member mounted on the shaft, and a resilient member. The shaft includes a post and a blocking portion. A slope surface is formed from one end of the protruding portion. The positioning portion is formed on the positioning member facing to the protruding portion of the bracket. An inclined stopping surface is formed from one end of the positioning portion. The resilient member fits about the shaft between the blocking portion and the positioning member. When the shaft rotates with respect to the bracket beyond the limits of a desired angle, the protruding portion drives the inclined stopping surface of the positioning member to move the positioning member away from the bracket to compress the resilient members for obviating the hinge to be damaged.

17 Claims, 4 Drawing Sheets

HINGE

BACKGROUND

1. Technical Field

The disclosure relates to mechanical structures and, particularly, to a hinge.

2. Description of Related Art

A foldable device, such as a notebook computer or a clamshell mobile phone, generally includes two parts pivotally connected via a hinge. The hinge generally includes a limiting mechanism for positioning one part of the foldable device with respect to the other part of the foldable device at desired angles. However, mishandling of such a foldable device by a user, such as over-rotating, impacting, could damage the limiting mechanism of the hinge.

DETAILED DESCRIPTION

Figure 1:
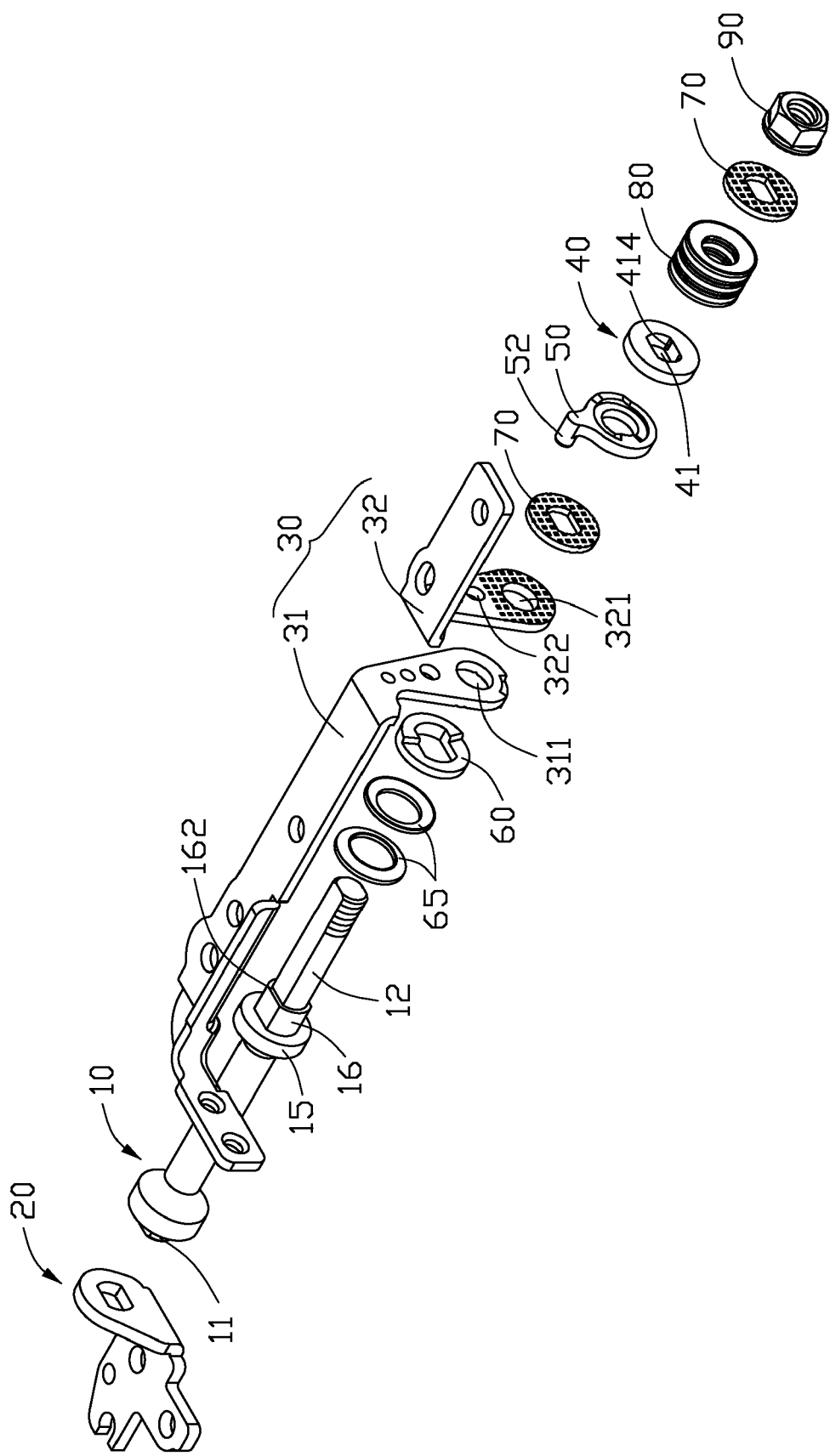
FIG. 1 is an exploded, isometric view of an exemplary embodiment of a hinge, the hinge including a bracket and a positioning member.
Figure 2:
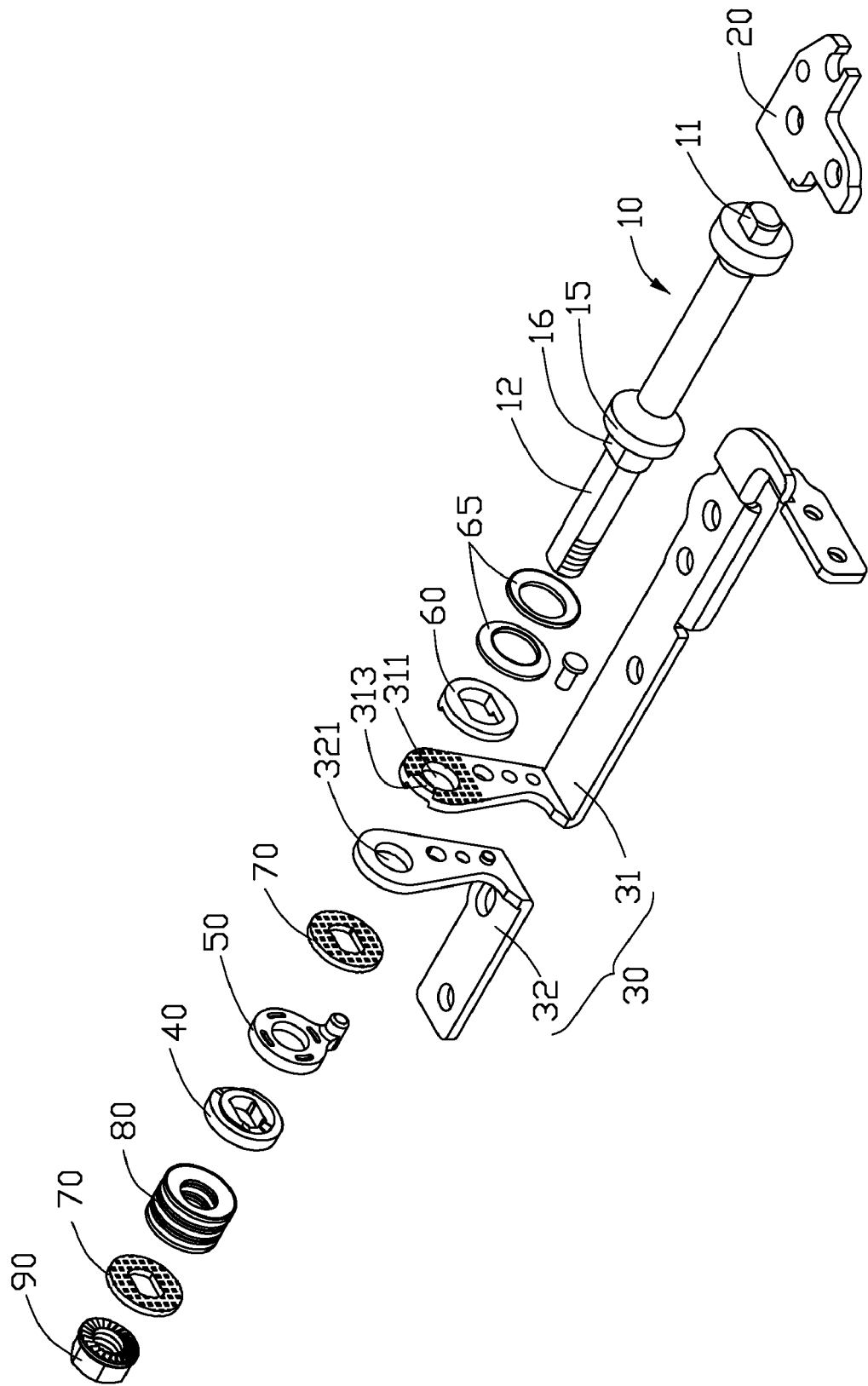
FIG. 2 is an inverted view of the hinge of FIG. 1.

Referring to FIGS. 1 and 2, an exemplary embodiment of a hinge is adapted to be mounted to a foldable device, such as a notebook computer or a clamshell mobile phone, which includes two parts rotatably connected to each other via the hinge. The hinge includes a shaft 10, a rack 20 mounted to one part of the foldable device, a bracket 30 mounted to the other part of the foldable device, a first interfering member 40, a second interfering member 50, a positioning member 60, two resilient members 65, two friction pieces 70, a resilient assembly 80, and a fastener 90.

The shaft 10 includes a post 12 and a fixed portion 11 extending from two opposite ends of the shaft 10. The fixed portion 11 is used for fixing the shaft 10 to the rack 20. A blocking portion 15 is formed on the shaft 10 between the post 12 and the fixed portion 11. A setting portion 16 is formed around the post 12 adjacent to the blocking portion 15 and opposite to the fixed portion 11. A stopping surface 162 is formed on the setting portion 16 facing to the post 12. The post 12 and the setting portion 16 have noncircular, double-D shaped cross sections. A free end of the post 12 forms a threaded portion.

Figure 3:
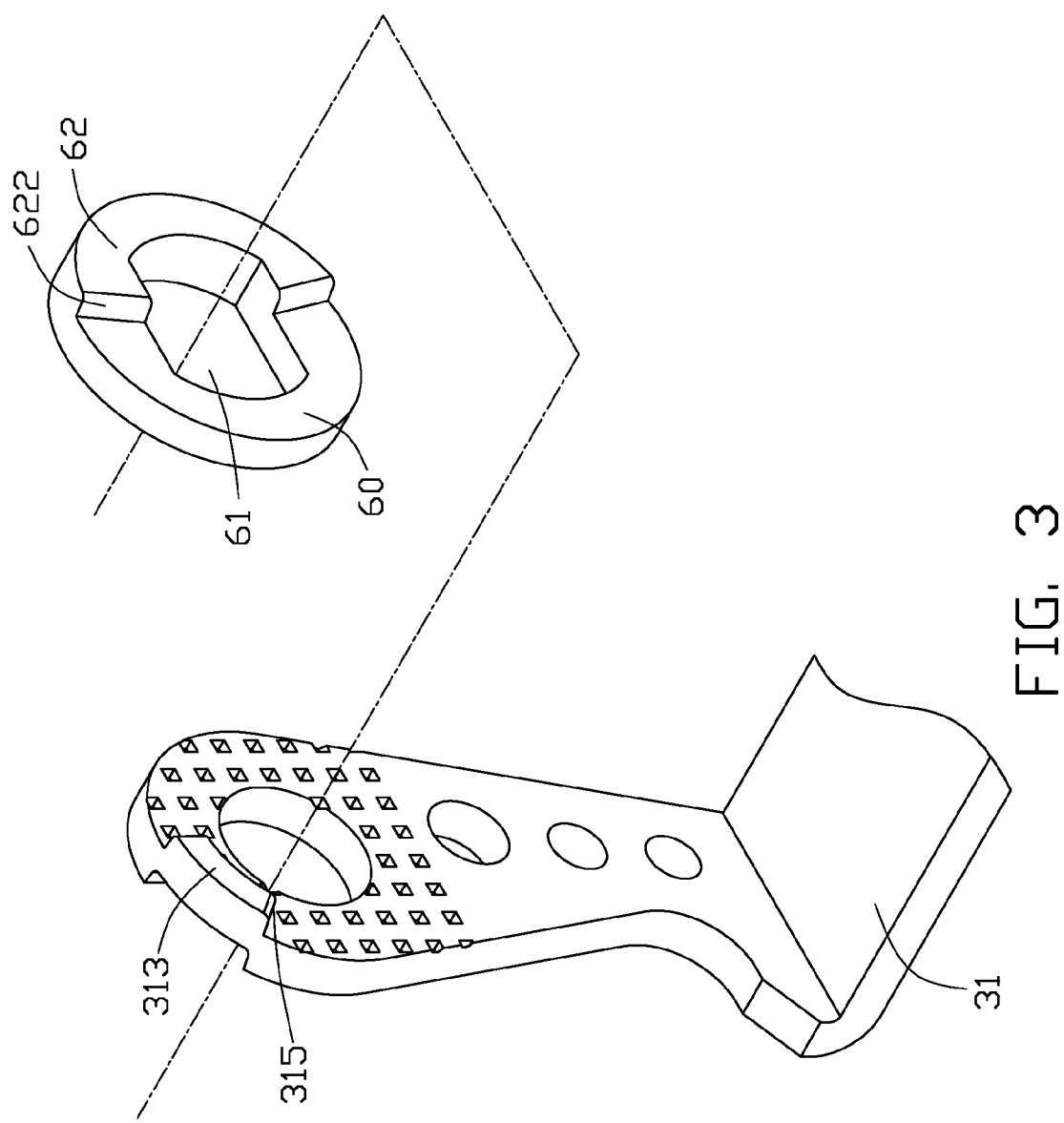
FIG. 3 is an exploded, enlarged view of the bracket and the positioning member of FIG. 2.
Figure 4:
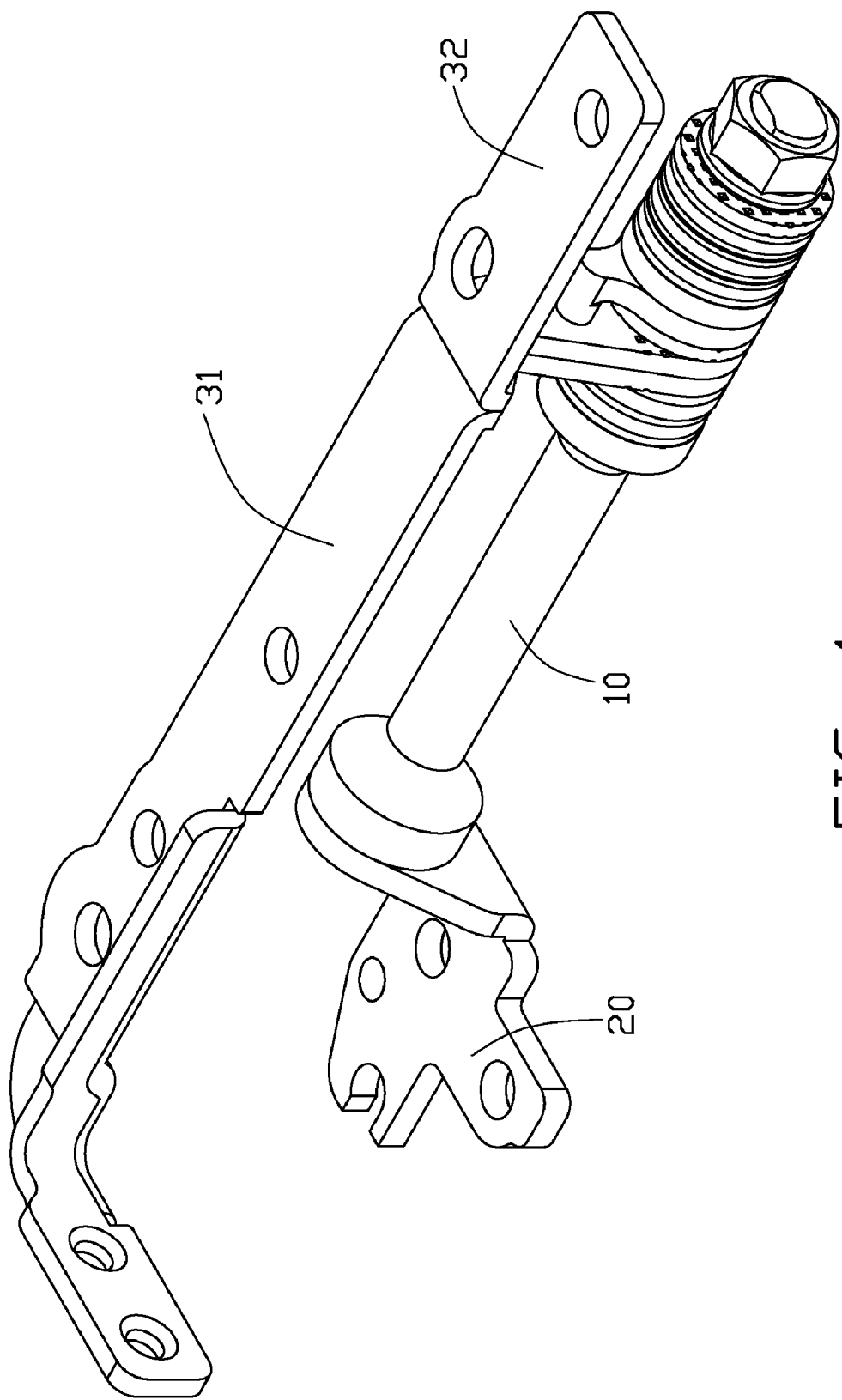
FIG. 4 is an assembled, isometric view of the hinge of FIG. 1.

Referring to FIG. 3, the bracket 30 includes a first pivoting member 31 and a second pivoting member 32. The first and second pivoting members 31 and 32 are fixed together via rivets or screws. Alternatively, the first pivoting member 31 and the second pivoting member 32 may be integrally formed. The first and second pivoting members 31 and 32 respectively defines a plurality of mounting holes to fix the first and second pivoting members 31 and 32 to the foldable device. The first pivoting member 31 forms a bending portion at an end of the first pivoting member 31, adjacent to the second pivoting member 32. The bending portion of the first pivoting member 31 defines a pivoting hole 311 configured for the post 12 extending therethrough. The second pivoting member 32 forms a bending portion at an end adjacent to the first pivoting member 31. The bending portion of the second pivoting member 32 defines a pivoting hole 321 configured for the post 12 extending therethrough. An arc-shaped protruding portion 313 is formed at a distal end of the bending portion of the first pivoting member 31. Two slope surfaces 315 are formed on opposite ends of the portion 313. A mounting hole 322 is defined in the bending portion of the second pivoting member 32 adjacent to the pivoting hole 321.

The first interfering member 40 and the second interfering member 50 are engagable with and rotatable relative to each other. The first interfering member 40 is generally cylindrical-shaped, defining a double-D shaped through hole 41, to snugly fit about the post 12. A plurality of wedges 414 is formed on a sidewall bounding the through hole 41, for firmly mounting the first interfering member 40 on the post 12. The second interfering member 50 is generally cylindrical-shaped, defining a through hole (not labeled) for rotatably receiving the post 12. An inserting pillar 52 is formed on a circumference of the second interfering member 50, for being inserted into the mounting hole 322 to fix the second interfering member 50 to the second pivoting member 32.

The positioning member 60 is generally cylindrical-shaped, defining a double-D shaped through hole 61, to snugly fit about the setting portion 16 of the shaft 10. A C-shaped positioning portion 62 is formed on one side of the positioning member 60 around the through hole 61. Two inclined stopping surfaces 622 are formed from opposite ends of the positioning portion 62.

Each resilient member 65 defines a round through hole (not labeled) for rotatably fitting about the setting portion 16 of the shaft 10, and are located between the blocking portion 15 and the positioning member 60. In this embodiment, the resilient members 65 are washers. In an alternative embodiment, the resilient member 65 can include springs or other types of resilient components.

Each friction piece 70 defines a double-D shaped through hole for receiving the post 12. Each friction piece 70 has a plurality of receiving holes (not labeled) defined for retaining lubricant therein.

The resilient assembly 80 includes a plurality of resilient pieces, each of which defines a round through hole (not labeled) for rotatably receiving the post 12. These resilient pieces are stacked together on the post 12. In an alternative embodiment, the resilient assembly 80 can include springs or other types of resilient components.

In the illustrated embodiment, the fastener 90 is a nut, and can be screwed on the threaded portion of the post 12.

Referring to FIGS. 1 through 4, in assembly, the post 12 of the shaft 10 is inserted through the resilient members 65, the positioning member 60, the first pivoting member 31, the second pivoting member 32, one of the friction pieces 70, the second interfering member 50, the first interfering member 40, the resilient assembly 80, the other one of the friction pieces 70 orderly, to be screwed to the fastener 90. The first pivoting member 31, the second pivoting member 32, one of the friction pieces 70, the second interfering member 50, the first interfering member 40, the resilient assembly 80 and the other one of the friction pieces 70 are located between the fastener 90 and the stopping surface 162 of the stopping portion 16.

In use, a part of the foldable device rotates with respect to the other part of the foldable device to switch between an open or closed position. The protruding portion 313 of the bracket 30 can be engagable with the inclined stopping surfaces 622 of the positioning member 60 for positioning one part of the foldable device with respect to the other part of the foldable device at desired angles. If a user over-rotates the foldable device or accidentally applies impact upon the foldable device, a corresponding slope surface 315 of the protruding portion 313 drives the corresponding inclined stopping surfaces 622 of the positioning member 60 to move the positioning member 60 away from the first pivoting member 31 to compress the resilient members 65. Therefore, the foldable device will rotate beyond the limits of the desired angle limited by the positioning member 60 and the protruding portion 313 of the bracket 30, accompanying the hinge of the foldable device prevent damages from occurring.

While several embodiments have been disclosed, it is understood that any element disclosed in any one embodiment is easily adapted to other embodiments. It is also to be understood, however, that even though numerous characteristics and advantages of the disclosure have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A hinge, comprising:
a shaft comprising a post and a blocking portion;
a bracket defining a pivoting hole for the post of the shaft rotatably extending therethrough, a protruding portion extending from one side of the bracket, a slope surface formed from one end of the protruding portion;
a positioning member mounted on the shaft, a positioning portion formed on one side of the positioning member facing to the protruding portion of the bracket, an inclined stopping surface formed from one end of the positioning portion; and
a resilient member defining a through hole for fitting about the shaft, located between the blocking portion and the positioning member;
wherein when the shaft rotates with respect to the bracket beyond limits of a desired angle, the slope surface of the protruding portion drives the inclined stopping surface of the positioning member to move the positioning member away from the bracket to compress the resilient member for obviating damages to the hinge;
wherein a setting portion is formed on the shaft between the blocking portion and the post, a stopping surface is formed on the setting portion facing the post, the bracket engages with the stopping surface, the resilient member and the positioning member are located between the blocking portion and the bracket.

2. The hinge of claim 1, further comprising a first interfering member and a second interfering member engagable with and rotatable relative to each other, wherein the first and second interfering members fit about the post and located on the other side of the bracket opposite to the positioning member.

3. The hinge of claim 2, wherein the post has a double-D shaped cross section, the first interfering member is generally cylindrical-shaped and defines a double-D shaped through hole, to snugly fit about the post.

4. The hinge of claim 3, wherein at least one wedge is formed on a sidewall bounding the through hole of the first interfering member, for firmly mounting the first interfering member on the shaft.

5. The hinge of claim 2, wherein the bracket defines a mounting hole, and an inserting pillar is formed on a circumference of the second interfering member, for being inserted into the mounting hole to mount the second interfering member to the bracket.

6. The hinge of claim 1, further comprising at least one friction piece retained on the shaft, wherein each of the at least one friction piece defines a plurality of receiving holes for retaining lubricant.

7. The hinge of claim 1, wherein the bracket comprises a first pivoting member and a second pivoting member mounted to the first pivoting member, the protruding portion is formed on the first pivoting member opposite to the second pivoting member.

8. The hinge of claim 2, further comprising a resilient assembly rotatably retained on the shaft for packing the first interfering member and the second interfering member together, and a screw fixed to a distal end of the post to locate the resilient member, the first interfering member and the second interfering member are located between the resilient assembly and the bracket.

9. A foldable device comprising:
a first cover;
and a second cover; and
a hinge rotatably connecting the first cover and the second cover, the hinge comprising:
a rack fixed to the first cover;
a shaft fixed to the rack, and comprising a post and a blocking portion;
a bracket fixed to the second cover, and capable of rotating with respect to the shaft, a protruding portion extending from one side of the bracket;
a positioning member mounted on the post, a positioning portion formed on one side of the positioning member facing to the protruding portion of the bracket, an inclined stopping surface formed from one end of the positioning portion;
a resilient member defining a through hole for fitting about the shaft between the blocking portion and the positioning member; and
a fastener capable of fastening the bracket, the positioning member, and the resilient member on the post;
wherein when the second cover rotates with respect to the first cover beyond the limits of a desired angle limited by the positioning member and the protruding portion of the bracket, the protruding portion drives the inclined stopping surface of the positioning member to move the positioning member away from the bracket to compress the resilient member for obviating the hinge to be damaged;
wherein a setting portion is formed on the shaft between the blocking portion and the post, a stopping surface is formed on the setting portion facing to the post, the bracket engages with the stopping surface, the resilient member and the positioning member are located between the blocking portion and the bracket.

10. The foldable device of claim 9, further comprising a first interfering member and a second interfering member engagable with and rotatable relative to each other, wherein the first interfering member and the second interfering member are located on the post between the fastener and the bracket and located on the other side of the bracket opposite to the positioning member.

11. The foldable device of claim 10, wherein the post has a double-D shaped cross section, the first interfering member is generally cylindrical-shaped and defines a double-D shaped through hole, to snugly fit about the post.

12. The foldable device of claim 11, wherein at least one wedge is formed on a sidewall bounding the through hole of the first interfering member, for firmly mounting the first interfering member on the shaft.

13. The foldable device of claim 10, wherein the bracket defines a mounting hole, and an inserting pillar is formed on a circumference of the second interfering member, for being inserted into the mounting hole to mount the second interfering member to the bracket.

14. The foldable device of claim 10, further comprising a resilient assembly rotatably retained on the shaft between the fastener and the first interfering member for packing the first interfering member and the second interfering member together.

15. The foldable device of claim 9, further comprising two friction pieces retained on the post, each of the friction pieces defines a plurality of receiving holes for retaining lubricant.

16. The foldable device of claim 9, wherein the bracket comprises a first pivoting member and a second pivoting member mounted to the first pivoting member, the protruding portion is formed on the first pivoting member opposite to the second pivoting member.

17. The foldable device of claim 16, wherein a slope surface is formed on one end of the protruding portion.

* * * * *